United States Patent [19]

Maddox

[11] 4,260,508
[45] Apr. 7, 1981

[54] STABILIZED ALKALI METAL PERCARBONATE POWDER BLEACH

[75] Inventor: Lodric L. Maddox, Oakland, Calif.

[73] Assignee: The Clorox Company, Oakland, Calif.

[21] Appl. No.: 66,575

[22] Filed: Aug. 15, 1979

[51] Int. Cl.$^3$ ................................. C11D 7/54
[52] U.S. Cl. ........................ 252/99; 252/135; 252/186; 8/111; 427/213; 427/215; 423/415 P; 23/313 R; 23/313 FB
[58] Field of Search ............ 252/99, 135, 186; 427/213, 215; 8/111; 423/415 P; 23/313 R, 313 FB

[56] References Cited

U.S. PATENT DOCUMENTS

| | | | |
|---|---|---|---|
| 2,820,690 | 1/1956 | Feldmann | 8/111 |
| 3,755,179 | 8/1973 | Fitzgerald, Jr. | 252/186 X |
| 3,773,678 | 11/1973 | Munday | 252/186 |
| 3,945,937 | 3/1976 | Villaume | 252/99 X |
| 3,951,838 | 4/1976 | Jayawant | 252/99 |
| 3,977,988 | 8/1976 | Tokiwa et al. | 252/99 |
| 4,075,116 | 2/1978 | Mesaros | 252/99 X |
| 4,105,827 | 8/1978 | Brichard et al. | 427/215 X |
| 4,135,010 | 1/1979 | Klebe et al. | 427/215 D |
| 4,171,280 | 10/1979 | Maddox et al. | 252/99 X |
| 4,179,394 | 12/1979 | Dillenburg et al. | 252/99 X |

Primary Examiner—Mayer Weinblatt
Attorney, Agent, or Firm—Phillips, Moore, Weissenberger, Lempio & Majestic

[57] ABSTRACT

A powdered sodium percarbonate composition is provided which exhibits significantly improved percarbonate stability during storage. The sodium percarbonate is stabilized by a phosphate containing compound such as sodium tripolyphosphate or sodium orthophosphate. The powdered sodium percarbonate composition is useful as a powder bleach and preferably comprises a separation resistant bleach composition in the form of a plurality of particles, substantially each particle including sodium carbonate, sufficient sodium percarbonate to provide from about 1 to about 6 weight percent available oxygen, and sufficient of the phosphate containing stabilizer to retard decomposition of the percarbonate.

8 Claims, No Drawings

STABILIZED ALKALI METAL PERCARBONATE POWDER BLEACH

BACKGROUND OF THE INVENTION

The invention is concerned with peroxide powder bleach compositions and their formation. More particularly, the invention relates to alkali metal percarbonate powder bleach compositions which exhibit a high degree of storage stability, and which can be produced to retain component proportions from the top to the bottom of the box filled therewith. Alkali metal percarbonate shall be the term used herein, although the alkali metal precarbonates are more properly believed to exist as the perhydrates of the alkali metal carbonates.

PRIOR ART

For domestic and commercial clothes washing purposes, bleaching aids fall generally into two major categories. These categories are chlorine based compositions and oxygen based compositions. Powder bleach compositions are usually of the oxygen type and generally comprise either percarbonate or perborate as the oxygen releasing compound.

Sodium perborate is normally preferred over sodium percarbonate in powdered bleaching compositions because sodium perborate is more stable (retains more available oxygen) than sodium percarbonate during prolonged storage. External moisture and the presence of heavy metals in the sodium carbonate ((usually mixed soda ash)) from which the sodium percarbonate is made are believed to contribute to the instability of sodium percarbonate.

Since percarbonates are economical and safe bleaching agents for a variety of textiles, many attempts have been made to stabilize percarbonate bleaching compositions against the relatively rapid loss of available oxygen content.

For practical uses, percarbonate bleaching compositions need to be sufficiently stabilized to provide at least an adequate amount of available oxygen after long-term storage. Sodium percarbonate is normally prepared by reacting sodium carbonate with hydrogen peroxide to produce pure crystalline particles of sodium percarbonate having 12% to 15% available oxygen. To prepare a powdered bleaching composition, the sodium percarbonate is then mixed with sufficient amounts of other components to dilute to a suitable and desired available oxygen content.

Among teachings for improving percarbonate stability are a process for coating the sodium percarbonate particles with a mixture of silica and silico-fluoride (U.S. Pat. No. 3,977,988), and a process for coating sodium percarbonate particles with an aqueous solution of silica (U.S. Pat. No. 3,951,838). These prior art coated sodium percarbonate particles can then be used in bleaching composition formulations by dry-blending with particles of detergent, or with common bleaching composition components.

Among the problems associated with conventional percarbonate bleaching compositions are, as mentioned, the relatively rapid percarbonate decomposition. Also, some coatings on percarbonate particles in powdered bleach compositions tend to not dissolve readily during laundry use which may result in an undesirable insoluble residue remaining in the laundry or on the textiles. Further, powder bleach formulations which mix bleaching particles and additional component particles have a tendency to separate on handling and storage. Thus, a dry bleach composition which originally might have sodium percarbonate particles mixed with other particles in an originally uniform distribution therethrough can eventually have a concentration of one of these components in one part of the box and a concentration of another of the components in another part of the box. Such separation occurs due to different densities, particle sizes, particle shapes, and the like. Upon consumer use of such boxed conventional component mixtures, a significantly varying bleach concentration may be obtained during use of the package product.

A percarbonate powdered bleach composition and processes for the making thereof which overcome the problems of separation of bleach components, and which provide that the available oxygen content is more quickly available in solution is taught in pending applications Ser. Nos. 848,216, filed Nov. 3, 1977 and 886,662 filed on Mar. 14, 1978, of common assignment herewith. The disclosure of these pending applications with respect to the just mentioned problems is hereby incorporated by reference.

It is an object of the present invention to provide a powdered bleach composition having sodium percarbonate therein to supply the available oxygen content thereof, which composition exhibits significantly improved storage stability.

It is a further object of the present invention to provide a powder bleach composition which is resistant to separation.

Another object of the present invention is to provide a powder bleach composition wherein substantially each particle thereof comprises sodium carbonate, sodium percarbonate, and a stabilizer for the sodium percarbonate so that separation of the composition does not occur on handling or storage, and wherein substantially every particle is stabilized.

Yet another object of the present invention is to provide a stabilized powder bleach composition which is resistant to lumping and caking during storage.

A still further object of the present invention is to provide a sodium percarbonate powder bleach composition wherein the available oxygen content is more quickly available in solution than in prior art compositions.

SUMMARY OF THE INVENTION

The present invention provides a composition of matter comprising sodium percarbonate and a stabilizer for the percarbonate. The necessary stabilizer has been found to comprise phosphate containing compounds which retard decomposition of the percarbonate.

The invention is also concerned with providing a separation resistant, stabilized percarbonate powder bleach composition comprising a plurality of particles, substantially each of these particles comprising sufficient sodium percarbonate to provide about one to about six weight percent available oxygen, and a stabilizer for the sodium percarbonate, the stabilizer comprising a phosphate compound.

DETAILED DESCRIPTION OF THE PREFERRED EMBODIMENTS

The invention provides a stabilized sodium percarbonate powdered bleach composition comprising two essential components; sodium percarbonate and a stabilizer for the percarbonate comprising a phosphate compound.

STABILIZER

It has been found that phosphate containing compounds significantly retard decomposition of percarbonate containing powdered bleach compositions. The phosphates useful for stabilizing the percarbonate in a composition of the invention are tripolyphosphate (mono, di, tri, tetra, and penta basic), orthophosphate(-mono, di and tri basic), pyrophosphate (mono, di, tri and tetra basic) and mixtures of these. The cationic species of the phosphate containing compounds preferred in a composition of the invention are the alkali metals and single charged cations such as sodium, potassium, lithium, hydrogen, and ammonium which cations readily release their anionic phosphate components.

The preferred stabilizer is penta basic tripolyphosphate.

SODIUM PERCARBONATE

Sodium percarbonate is commercially available, and conventional methods for its preparation are known. In general, sodium percarbonate is prepared from soda ash which can be dissolved in aqueous hydrogen peroxide solution. Soda ash for a composition of the invention can be in the monohydrate or anhydrous form, and is preferably the anhydrous form of sodium carbonate. Sodium percarbonate is an adduct of sodium carbonate and hydrogen peroxide in a wide range of proportions. One pure, crystalline form of sodium percarbonate has the general formula $Na_2CO_3 \cdot 1.5H_2O_2$. When sodium percarbonate is dissolved in an aqueous solution, sodium carbonate and hydrogen peroxide are released, the amount of available oxygen being dependent upon the proportion of hydrogen peroxide associated within the sodium percarbonate molecule.

Shelf life stability of the percarbonate at any particular set of temperature and humidity conditions is dependent upon a variety of factors, such as the amount of heavy metal impurities present, the amount of hydrogen peroxide in the percarbonate molecule, the presence of other composition components, the packaging container surrounding the composition, and the amount of moisture in the percarbonate composition.

A preferred composition of the invention provides from about one to about six weight percent of available oxygen, more preferably from about three to about six weight percent available oxygen, for household bleaching use. The amount of stabilizer found to be sufficient to significantly retard percarbonate decomposition at this bleaching concentration level is about 0.2 weight percent of the percarbonate composition, with amount of about 0.6 to 1.0 weight percent providing better percarbonate stability. Above about 1.0 weight percent, increased amounts of the stabilizer compound do not significantly increase the percarbonate stability when the available oxygen of the composition is from about one to about six weight percent.

The increased stability of a composition of the invention is illustrated by Example I.

EXAMPLE I

Two percarbonate compositions were prepared. The first was a composition of the invention wherein the stabilizer was sodium monobasic orthophosphate ($NaH_2PO_4$). The composition of the invention comprised commercial sodium percarbonate mixed with commercial soda ash. These components were fluidized and a 50 weight percent aqueous solution of $NaH_2PO_4$ was sprayed thereon to provide a composition of the invention with an initial available oxygen content of 2.87 weight percent. A second percarbonate composition was prepared as was the composition of the invention, but the second percarbonate composition did not include any stabilizer for the percarbonate.

Samples of the two compositions were then stored side-by-side under two different storage conditions simulating extreme temperature and relative humidity conditions. Storage was for a period of seven weeks. The percent of initial available oxygen remaining after seven weeks was then measured as illustrated below.

|  | % Initial Available Oxygen Remaining After 7 Weeks | |
| --- | --- | --- |
|  | 90° F./ 85% R.H. | 120° F./ 20% R.H. |
| Composition of the Invention | | |
| 18.8 wt. % $Na_2CO_3 \cdot 1.5H_2O_2$ | 93 | 81 |
| 0.6 wt. % $NaH_2PO_4$ | | |
| 80.0 wt. % $Na_2CO_3$ | | |
| 0.6 wt. % $H_2O$ | | |
| Commercial Product Mixture: | | |
| 18.9 wt. % $Na_2CO_3 \cdot 1.5H_2O_2$ | 89 | 63 |
| 80.5 wt. % $Na_2CO_3$ | | |
| 0.6 wt. % $H_2O$ | | |

Comparison of the above data illustrates improved percarbonate stability of a composition of the invention over a nonstabilized percarbonate composition when stored in a hot, humid (R.H.=relative humidity) environment, and significantly improved stability of the inventive composition over the nonstabilized percarbonate composition when stored in a very hot, low humidity environment.

EXAMPLE II

Two percarbonate compositions were prepared wherein the sodium percarbonate was produced by fluidizing sodium carbonate monohydrate and spraying onto the fluidized sodium carbonate monohydrate a 50% solution of hydrogen peroxide. The first percarbonate bleach composition (a) was a composition of the invention wherein the phosphate containing stabilizer was $NaH_2PO_4$ in an amount of 0.5 weight percent of the composition. The comparison percarbonate bleach composition (b) included sodium sulfate in an amount of 0.5 percent of the composition (but no phosphate containing stabilizer) for comparison of the stabilization effect. The two compositions were stored side-by-side under the temperature and relative humidity conditions as in Example I. A measurement of the percent initial available oxygen remaining after four weeks storage was made and is tabulated below.

|  | % Initial Available Oxygen Remaining After 4 Weeks | |
| --- | --- | --- |
|  | 90° F./ 85% R.H. | 120° F./ 20% R.H. |
| Composition of the Invention(a) (with 0.5 wt. % $NaH_2PO_4$ as stabilizer) | 82 | 74 |
| Comparison percarbonate composition(b) (with 0.5 wt. % $Na_2SO_4$ | 60 | 64 |

|  | % Initial Available Oxygen Remaining After 4 Weeks | |
|---|---|---|
|  | 90° F./ 85% R.H. | 120° F./ 20% R.H. |
| as comparison salt) | | |

As can be seen from the above data, the inventive composition (a) displays significantly improved percarbonate stability over a percarbonate composition (b) which did not include the phosphate containing compound.

The preferred embodiment of a composition of the invention is a stabilized percarbonate bleach composition wherein the sodium percarbonate is of sufficient amount to provide from about 1 to about 6 wt.% available oxygen, and the stabilizer is a phosphate containing compound.

Most preferred is a stabilized percarbonate powder bleach composition comprising a plurality of particles wherein substantially each particle includes sodium carbonate, sufficient sodium percarbonate to provide from about 1 to about 6 wt.% available oxygen, and a phosphate containing stabilizer. The stabilizer preferably is dissolved in a solution of hydrogen peroxide. The solution provides a stabilizer concentration of about 0.6 wt.% with respect to the total amount of percarbonate-based powdered bleach. This insures that sufficient stabilizer for the percarbonate in the final product is provided.

Although the preferred embodiment of the inventive composition is obtained by means of dissolving the stabilizer into the hydrogen peroxide solution prior to conversion of sufficient sodium carbonate to sodium percarbonate, it should be understood that the invention can also be practiced by spray introduction or other uniform distribution of the stabilizer separate from the hydrogen peroxide spray step.

The hydrogen peroxide solution useful for conversion of sufficient sodium carbonate to sodium percarbonate for providing substantially each particle with about 1 to about 6 wt.% available oxygen comprises a solution of hydrogen peroxide in water and generally comprises from about 20 to about 70 wt.% hydrogen peroxide in water. Preferrably, the concentration of hydrogen peroxide will fall within a range from about 20 to about 50 wt.%. Still more preferrably, the concentration of hydrogen peroxide in the hydrogen peroxide solution will fall within a range of about 25 to 35 wt.%.

The sodium carbonate is first properly sized in accordance with the particle size distribution of the desired end product. Generally, the mesh size of the sodium carbonate as well as the mesh size of the final product particles will fall within a range of about 10 to about 200 mesh and more preferably within a range from about 20 mesh to about 100 mesh.

In the preferred embodiment of the present invention that ratio of the hydrogen peroxide added to sodium carbonate is appropriately chosen to provide a final dry bleach composition which has sufficient sodium percarbonate to provide from about 1% to about 6 wt.% available oxygen. It is preferred that each of the percarbonate powder bleach particles has from about 3% to about 6 wt.% of available oxygen. If the available oxygen content is made too high, that is, if it is made significantly above about 6 wt.%, then the mixture formed from the reaction of hydrogen peroxide with sodium carbonate will tend to cake. Also, if the available oxygen content is above about 6 wt.% the bleach composition will have an unduly high ratio of sodium percarbonate to sodium carbonate for the intended end usage whereby it will become necessary to add additional sodium carbonate thereto. If this is done then problems of separation between the pure sodium carbonate particles and the particles in accordance with the present invention may result (and, the storage stability in terms of maintenance of available oxygen content may be adversely affected.)

The sodium carbonate is fluidized within a fluid bed reactor by heated air. The temperature of the air entering the fluid-bed reactor will generally fall within a range from about 60° C. to about 140° C. and more preferably with a range from about 80° C. to about 120° C. although with different reactors the entering air temperature range may differ. This will provide a contacting temperature within the reactor from about 35° C. to about 70° C.

Also introduced into the fluid-bed reactor is the hydrogen peroxide solution containing the percarbonate stabilizer. This may be sprayed into the fluidized bed or may be sprayed onto the sodium carbonate shortly prior to the fluidization thereof. Alternatively, a separate water based solution of the stabilizer can be sprayed onto the sodium carbonate, either during or prior to fluidization thereof. The residence time of the reactants within the fluid-bed reactor should be as short a time as possible to obtain a proper form of the product. Surprisingly, it has been found that a residence time of as little as about one minute is sufficient to obtain an available oxygen content of about 1 to about 2 wt.% with about 95% efficient utilization of the added hydrogen peroxide. Generally the residence time should, however, be at least 2.5 minutes and more preferably at least 3.5 minutes to obtain available oxygen contents in the 1% to 6% range. The reactants and the resultant product can be kept in the reactor as long as desired but this will both lower the yield and needlessly waste energy. A preferable residence time range is 3.5 to 20 minutes with times of 4 to 10 minutes having been repeatedly used successfully and with high yield.

Additional materials may also be added to the dry bleach composition to improve its properties or to make it more acceptable to the ultimate user. For example perfume, surfactant, color, whitening agents, water softening agents and the like may be added. It is desirable that these additions not be added prior to the entry of the sodium carbonate into the fluid-bed reactor since they would have a tendency to interfere with the reaction taking place therein. Further more, for extremely long storage of a composition of the invention, additional percarbonate stabilizers known to the art, such as fumed silica, may also be incorporated into compositions of the invention.

Improved stability of compositions of the invention prepared by the preferred process is illustrated in Example III.

EXAMPLE III

Stabilized percarbonate powder bleach compositions of the invention (1–11) were prepared in accordance with the preferred process wherein substantially each particle of the inventive percarbonate powder bleach composition comprised sufficient percarbonate to provide from about 3 to about 4 wt.% initial available oxygen and a stabilizer for the percarbonate in an amount of 0.5 wt.% of the total composition. A twelfth percarbonate powder bleach composition (12) was prepared in accordance with a preferred process, but the twelfth composition did not incorporate the necessary stabilizer compound. Seven comparison percarbonate compositions included either a chloride or a sulfate comparison salt in an amount of 0.5 wt.% of the total composition. The percent initial available oxygen and the stabilizer compound or comparison salt compound were as follows:

| Compositions of the Invention | Stabilizer (0.5 wt % of Composition) | % Initial available oxygen |
|---|---|---|
| 1 | $Na_5P_3O_{10}$ | 3.3 |
| 2 | $Na_4P_2O_7$ | 3.7 |
| 3 | $Na_3PO_4$ | 3.6 |
| 4 | $Na_2HPO_4$ | 3.9 |
| 5 | $NaH_2PO_4$ | 3.7 |
| 6 | $Li_2HPO_4$ | 3.6 |
| 7 | $LiH_2PO_4$ | 3.6 |
| 8 | $K_2HPO_4$ | 3.6 |
| 9 | $(NH_4)_2HPO_4$ | 4.0 |
| 10 | $(NH_4)H_2PO_4$ | 3.8 |
| 11 | $H_3PO_4$ | 3.7 |
| Unstabilized Control Composition | | |
| 12 | — | 4.3 |

| Comparison Percarbonate Compositions (incorporating comparison salt) | Comparison salt (0.5 wt. % of Composition) | |
|---|---|---|
| 13 | NaCl | 3.8 |
| 14 | $Na_2SO_4$ | 3.8 |
| 15 | LiCl | 3.7 |
| 16 | $Li_2SO_4$ | 3.8 |
| 17 | KCl | 3.7 |
| 18 | $NH_4Cl$ | 3.9 |
| 19 | $(NH_4)_2SO_4$ | 3.8 |

An identical storage test was performed for comparison between the eleven compositions of the invention, the twelfth unstabilized control composition, and the seven comparison compositions. These 19 percarbonate powder bleach compositions were prepared as described above and each was packed in a conventional powder bleach carton. The 19 compositions thus packaged were stored side-by-side under two different temperature and relative humidity conditions for seven weeks. Both of these temperature and relative humidity conditions were controlled, constant temperature/humidity storages. A stability study was then performed by measuring the percent of initial available oxygen remaining after the seven weeks. The first temperature/relative humidity condition represents a relatively hot, relatively humid storage environment. The second temperature/relative humidity condition represents a very hot, relatively dry environment.

| | % Initial Available Oxygen Remaining After 7 Weeks | |
|---|---|---|
| | 90° F./85% R.H. | 120° F./20% R.H. |
| Compositions of the Invention | | |
| 1 | 94 | 84 |
| 2 | 81 | 72 |
| 3 | 90 | 74 |
| 4 | 86 | 70 |
| 5 | 91 | 64 |
| 6 | 92 | 74 |
| 7 | 90 | 78 |
| 8 | 82 | 69 |
| 9 | 88 | 74 |

-continued

| | % Initial Available Oxygen Remaining After 7 Weeks | |
|---|---|---|
| | 90° F./85% R.H. | 120° F./20% R.H. |
| 10 | 89 | 77 |
| 11 | 89 | 81 |
| Unstabilized Control Composition | | |
| 12 | 78 | 57 |
| Comparison Percarbonate Compositions (incorporating comparison salt) | | |
| 13 | 78 | 63 |
| 14 | 73 | 53 |
| 15 | 77 | 59 |
| 16 | 73 | 56 |
| 17 | 81 | 61 |
| 18 | 81 | 61 |
| 19 | 82 | 63 |

As can be observed from the above data, compositions of the invention (1–11) displayed significantly improved remaining available oxygen after a period of seven weeks storage by comparison to a product (12) which did not contain the stabilizer component, and by comparison to the compositions (13–19) formulated with alkali metal chloride or sulfate salts.

Under the 90° F./85% relative humidity condition the phosphate stabilized compositions of the invention generally have a calculated available oxgyen half-life approximately twice that of the calculated available oxygen half-life of the unstabilized control composition. (The half-life represents the amount of time when 50% of the initial available oxygen has been lost.) The phosphate containing compound most effective for stabilizing the percarbonate composition of the invention was sodium tripolyphosphate (composition 1) which has a calculated available oxygen half-life over three times that of the unstabilized control composition.

EXAMPLE IV

Stability studies were conducted for two compositions of the invention (1,2), both of which included sodium tripolyphosphate as the stabilizer, for comparison with an unstabilized percarbonate control composition (3) and for comparison with a commercially available perborate powder bleach composition (4). These four compositions were stored under four different controlled temperature/relative humidity conditions, available oxygen measurements were taken at two weeks, four weeks and six weeks, and then the storage stability data for each composition was fitted to an exponential decay curve, $Y = Ae^{BX}$ (where Y=percent retained available oxygen, X=storage time in weeks, A=constant of 100, and B=the decay rate coefficient). The predicted values of percent initial available oxygen remaining after thirteen weeks storage are as follows:

EXAMPLE IV

| | % Initial Available Oxygen Remaining Predicted After 13 Weeks | | | |
|---|---|---|---|---|
| | 70° F./ 50% R.H. | 90° F./ 85% R.H. | 100° F./ 20% R.H. | 120 F./ 20% R.H. |
| Compositions of the Invention | | | | |
| 1. $Na_5P_3O_{10}$ as stabilizer at 0.6 wt. % of composition[a] | 95 | 77 | 84 | 56 |

-continued

| | % Initial Available Oxygen Remaining Predicted After 13 Weeks | | | |
|---|---|---|---|---|
| | 70° F./ 50% R.H. | 90° F./ 85% R.H. | 100° F./ 20% R.H. | 120 F./ 20% R.H. |
| (Initial Available Oxygen = 3.9%) 2. Na$_5$P$_3$O$_{10}$ as stabilizer at 1.0 wt. % of composition[b] | 98 | 25 | 98 | 92 |
| (Initial Available Oxygen = 4.0%) Unstabilized Percarbonate Composition | | | | |
| 3. (Initial Available Oxygen = 3.9%) Comparison Perborate Composition | 88 | 6 | 52 | 15 |
| 4. (Initial Available Oxygen = 3.6%) | 99 | 94 | 94 | 43 |

[a]composition 1 utilized sodium carbonate obtained from the Stauffer Chemical Co;
[b]composition 2 utilized sodium carbonate obtained from the Food Machinery corporation.

The individual values of the above data for each of the compositions (1–4) were then combined as a weighted average, wherein the relative weight of each storage environment was based upon the percent of time that the temperature/relative humidity condition generally exists in the actual market place. The factors used were: 0.75 for the 70° F./50% R.H. condition; 0.10 for the 100° F./85% R.H. condition; and 0.05 for the 120° F./20% R.H. condition. Thus, the weight average for the predicted percent initial available oxygen remaining after thirteen weeks storage for the four compositions above described is as follows:

| Composition of the Invention | Weighted Average for % Initial Available Oxygen Predicted After 13 Weeks |
|---|---|
| 1 | 90 |
| 2 | 91 |
| Unstabilized percarbonate composition | |
| 3 | 72 |
| Comparison perborate composition | |
| 4 | 95 |

As can be observed from the above data, compositions of the invention (1,2) are predicted to display significantly improved remaining available oxygen under actual market place conditions in comparison to unstabilized percarbonate powder bleach compositions (3); further, it is predicted that composition of the invention (1,2), wherein the necessary stabilizer comprises sodium tri-polyphosphate, will closely approach the storage stability in the actual market place of commercial perborate powder bleach as represented by composition (4).

EXAMPLE V

The 11 compositions of the invention subjected to the temperature-relative humidity conditions for seven weeks as in Example III were additionally tested for lumping and caking properties.

Lumping and caking grades were evaluated on a scale of 1 through 10 with higher numbers indicating more desirable properties such as easier pouring, less lumping, and less caking. A ranking of 7 or above is normally considered fully acceptable for consumer use.

For the lump test, a scale value of 10 represents no lumps visible in the packaged product; a scale value of 8 represents visible lumps after shaking which cannot be picked up with the fingers. Each pour was made at a 45° angle at 4 inches over a 2 foot square section of cardboard.

For the caking test, a scale value of 10 represents a lumpless, free flowing product of which 100% will pass freely through a ½" screen; a scale value of 8 represents a compacted product which is, however, easily dispensable in that 100% will pass freely through a ½" screen. The caking test consisted of pouring each of the test materials onto a ½" screen.

| Compositions of the Invention | Caking/Lumping Grade After 7 Wks. | |
|---|---|---|
| | 90° F./85% R.H. | 120° F./20% R.H. |
| 1 | 10/10 | 10/10 |
| 2 | 10/10 | 10/10 |
| 3 | 10/10 | 10/10 |
| 4 | 10/10 | 10/10 |
| 5 | 10/10 | 10/10 |
| 6 | 9/8 | 10/10 |
| 7 | 10/10 | 10/10 |
| 8 | 10/10 | 10/10 |
| 9 | 10/10 | 10/10 |
| 10 | 10/10 | 10/10 |
| 11 | 10/10 | 10/10 |

As the above data illustrates, compositions of the invention display excellent resistance to caking and lumping even under the prolonged, extreme temperature/relative humidity conditions of the test.

In summary, a stabilized percarbonate composition is provided wherein the necessary phosphate containing stabilizer component provides significantly improved percarbonate stability, and which composition is resistant to lumping and caking during storage.

While the invention has been described in connection with specific embodiments thereof, it will be understood that it is capable of further modification, and this application is intended to include any variations, uses or adaptation of the invention following, in general, the principles of the invention including such departures from the present disclosure as come within known or customary practice in the art to which the invention pertains, and which fall within the scope of the invention and the limits of the appended claims.

What is claimed is:

1. A separation resistant, stabilized percarbonate powder bleach composition, consisting essentially of:
   a plurality of particles, substantially each of said particles comprising sufficient sodium percarbonate to provide from about 1 to about 6 wt. % available oxygen, and a stabilizer for the sodium percarbonate for retarding decomposition of the percarbonate to substantially maintain the available oxygen provided therefrom, said stabilizer in an amount of from about 0.2 wt. % to about 1.0 wt. % of said composition, said stabilizer being a salt with an anionic species selected from the group consisting of tripolyphosphate, orthophosphate, pyrophosphate and mixtures thereof.

2. The composition of claim 1 wherein the stabilizer is sodium tripolyphosphate.

3. The composition of claim 1 wherein the stabilizer is sodium orthophosphate.

4. The composition of claim 1 wherein the particles fall generally in the range from about 10 mesh to about 200 mesh.

5. The composition of claim 1 wherein the particles fall generally in the range from about 20 mesh to about 100 mesh.

6. The composition of claim 1 wherein substantially each particle includes sodium carbonate.

7. The composition of claim 6 wherein the sodium carbonate is anhydrous.

8. A process for making a separation resistant, powder sodium percarbonate bleach having improved stability comprising the steps of:

dissolving a stabilizer for percarbonate, said stabilizer having an anionic species selected from the group consisting of tripolyphosphate, orthophosphate, pyrophosphate and mixtures thereof, in an aqueous solution of hydrogen peroxide to form a stabilizer and reactant solution;

contacting particulate sodium carbonate with sufficient of said stabilizer and reactant solution, said contacting being at a temperature which falls within a range from about 35° C. to about 70° C., to provide a reaction product composition, said reaction product composition having at least about 0.2 wt. % of stabilizer therein and sufficient sodium percarbonate to provide available oxygen in an amount from about 1 to about 6 weight percent of said reaction product composition and with said stabilizer being in intimate proximity with most of said sodium percarbonate; and recovering said reaction product composition from said contacting step.

* * * * *